United States Patent [19]

Buschor

[11] 4,357,900

[45] Nov. 9, 1982

[54] APPARATUS FOR THE AUTOMATIC COATING OF ARTICLES

[75] Inventor: Karl Buschor, St. Gallen, Switzerland

[73] Assignee: Gema AG Apparatebau, Switzerland

[21] Appl. No.: 250,656

[22] Filed: Apr. 3, 1981

[30] Foreign Application Priority Data

Apr. 12, 1980 [DE] Fed. Rep. of Germany ....... 3014114

[51] Int. Cl.³ .............................................. B05B 5/02
[52] U.S. Cl. .................................. 118/681; 118/316;
118/323; 118/324; 118/624; 118/629; 118/631;
118/679; 118/682; 118/684; 118/697; 118/699
[58] Field of Search ............... 118/679, 680, 681, 676,
118/316, 323, 324, 624, 629, 631, 682, 684,
118/697, 699

[56] References Cited

U.S. PATENT DOCUMENTS 3,606,162  9/1971  Lehmann .

FOREIGN PATENT DOCUMENTS 34687    2/1981  European Pat. Off. .
2644663  4/1978  Fed. Rep. of Germany .
2744247  4/1978  Fed. Rep. of Germany .
2114182  6/1972  France .
2435329  4/1980  France .
1107007  3/1968  United Kingdom .
2013934  8/1979  United Kingdom .

Primary Examiner—Bernard D. Pianalto
Attorney, Agent, or Firm—Ostrolenk, Faber, Gerb & Soffen

[57] ABSTRACT

An apparatus is disclosed for the automatic coating of articles. The apparatus has a spray device controlled by a programmed control device. A transport device transports the articles along a predetermined path to a coating position and then away therefrom after coating. A sensor monitors the position of the article and generates signals representative thereof, preferably generating one signal each time the article moves a predetermined distance (e.g. 2 cm.) along the path. A second sensor generates additional signals to the control device when an article passes a predetermined point, also indicating which of several types of articles has been detected. The control device controls the spraying process responsive to these signals. If desired, portions of the article that are moved sequentially into the coating position can be sprayed in different manners, e.g. with the spray devices positioned or oriented differently, or using different coating materials, etc. The control device is preferably reprogrammable.

25 Claims, 3 Drawing Figures

APPARATUS FOR THE AUTOMATIC COATING OF ARTICLES

BACKGROUND OF THE INVENTION

The present invention relates to an apparatus for the automatic coating of articles, and more particularly relates to an apparatus of the type having a spray device controlled by a programmed control device, which can carry out various work steps in a predetermined order, and having a transport device for transporting the articles to and from the coating position.

Apparatus of this type is known, for example, from Swiss Pat. No. 483,887, corresponding to U.S. Pat. No. 3,606,162, and U.S. Pat. Nos. 2,213,108, 2,878,058, 2,736,761, 3,229,660, 3,279,421 and 3,453,983, as well as West German Unexamined Application for Patent 27 44 247.

SUMMARY OF THE INVENTION

The principal object of the invention is to provide a substantially automated apparatus of this type, having a relatively simple construction.

It is another object of the invention to provide such an apparatus which requires less maintenance and consumes less energy than the prior art apparatus.

It is a further object of the invention to provide an apparatus with which it is possible to effect changes in the coating process (e.g., change the type of article being coated, switch coating procedures or switch coating agents) in a short time with minimum expense and without reducing production.

"Coating with a spray device" as used herein means coating by spraying either a liquid or preferably a powder onto the articles to be coated.

Other objects and features of the invention will be apparent from the following description and the accompanying drawings.

DETAILED DESCRIPTION OF THE PREFERRED EMBODIMENTS

Figure 1:
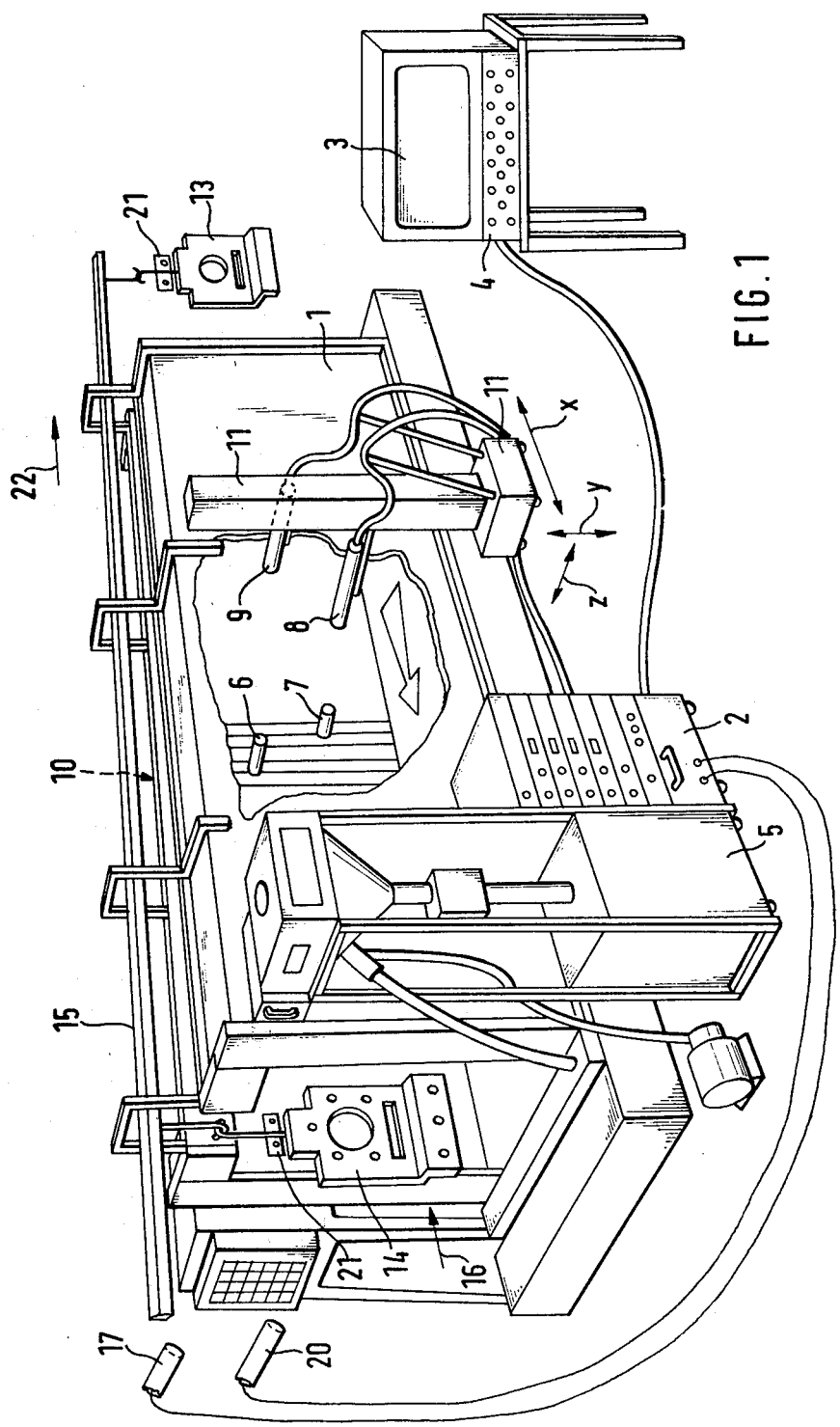
FIG. 1 is a diagrammatic perspective view of an apparatus in accordance with the invention.

FIG. 1 shows an apparatus for the automatic coating of articles with powder in a coating chamber 1. A control device 2 with a built-in microprocessor, a videoscreen unit 3 for the display of data pertinent to the operation of the apparatus and a keyboard 4 for inputting, modifying and running programs are provided.

Powder is removed pneumatically in a known manner from a powder container 5 and is fed to the spray nozzles 6-9, which are disposed to spray-coat an article passing through the coating chamber 1. The spray nozzles 6 and 7 are supported on a positioning stand 10 on one side of the chamber 1, and the spray nozzles 8 and 9 are supported on a positioning stand 11 on the other side of the chamber 1. The spray nozzles 6-9 extend through openings in the walls of the chamber 1, and are movable in all three possible orthogonal directions (along the x, y and z axes) so that they can be moved into any position that may be necessary for a given spray-coating operation. The required movement of spray nozzles 6-9 is effected partly by moving stands 10 and 11, and partly by moving the spray nozzles 6-9 relative to their stands 10, 11. The orientation of the spray nozzles 6-9 can also be controlled by motion thereof relative to the stands 10, 11. The powder to be sprayed is conveyed from container 5 to spray nozzles 6-9 pneumatically in a known manner and can, if desired, be electrostatically charged by conventional means (not shown) for the spray process.

Articles 13 and 14 to be coated are transported through the chamber 1 by a conveyor chain 15. At the start or upstream end 16 of the chamber 1, at the left in FIG. 1, there is a sensor 17 which monitors the progress of each article 13, 14 (or, more exactly, of the conveyor chain 15) through the chamber 1 and produces a clock signal to mark each time the chain 15 has moved a predetermined increment along its path. For example, a clock signal may be produced after each two centimeter (2 cm) advance of the conveyor chain 15. The clock signals are fed to the control unit 2. The clock signals of the sensor can, in accordance with the embodiment shown in FIG. 1, be produced by optical, electrical or magnetic scanning of suitable markings on the conveyor chain 15 of the transport device while the chain 15 is in motion.

The clock signal generator may be a mechanical or electric clock whose beat time or frequency equals the time required for the transport device to advance a predetermined distance. However, the clock generator is preferably a pulse generator which is driven synchronously with the transport device and which generates a pulse signal, preferably a square pulse, for each predetermined distance (e.g. 2 cm.) moved by the transport device.

The clock signals are used to control the operation of the apparatus, via control unit 2, in a manner to be described below. The types of steps that can be controlled by the control unit 2 and the clock signals include, for example, selecting a particular combination of spray nozzles 6-9 to use in the spraying operation, changing from one type of powder to another, starting or terminating the coating process as a whole, actuating or disconnecting the high-frequency high-voltage source for the electrostatic charging of the powder, displacing one or more of the spray nozzles 6-9 into a different position, moving one or more of the spray nozzles back and forth between two given positions, causing the spray nozzles to move together with, or opposite, the direction of movement of the article 13 or 14 to be coated, etc.

A second sensor 20 is provided at the inlet of the chamber to scan a code plate 21 on each article 13, 14, to determine when an article is present and if so which of several predetermined types of article it is. Sensor 20 may be of the same type as sensor 17. The sensors 17 and 20 are arranged at such a distance from the coating equipment 6-11 as not to be dirtied by the coating material.

The number of clock signals which must be operated for the article 13, 14 to move from the clock signal sensor 17 to the first coating position at the spray nozzles 6-9 is stored in a memory associated with a microprocessor forming part of control device 2. When the microprocessor receives a signal from the object sensor 20 that an article 13, 14 is entering the chamber, it counts the clock signals generated by the sensor 17 until it has counted the stored number of signals, indicating that the article 13 or 14 has reached the coating position. The actual coating program is then started.

Arrow 22 in FIG. 1 indicates the direction of movement of the conveyor chain 15. The conveyor chain 15 is an endless chain, although FIG. 1 shows only the part of the chain which is carrying the articles 13, 14 through the chamber 1 past the coating positions. The double arrows x, y and z show the possible axes and directions of movement of the spray nozzles 6-9. x represents movement parallel to the conveyor chain 15, y represents movement in the vertical direction, and z represents horizontal movement perpendicular to the direction of movement of the chain 15. Movements can be performed simultaneously in the x, y and z directions, so that the spray nozzles 6-9 can be moved in any desired direction. If desired, means for swinging the spray nozzles can also be provided. The spray nozzles may be operated to move back and forth between two positions, or be placed in respective fixed positions, or travel parallel to the article 13, 14 to be coated or move in the opposite direction to the articles.

In one very simple embodiment, the spray nozzles 6-9 can each be mounted in a fixed position and directed at the articles 13, 14 to be coated. In this case, if the article has a complicated shape, turbulence and distortions of the electrical field used to charge the coating material can result in a non-uniform coating. In order to improve the coating, the manner of operation of the spray nozzles must be changed while the article moves past the spray nozzle. For this purpose the following measures can be taken: The high voltages applied to each nozzle to charge the powder being sprayed therefrom can be changed, the amount of powder ejected per unit of time can be adapted to the article to be coated, the shape of the powder cloud produced by each nozzle 6-9 can be adapted to the article in question, and each nozzle can be brought into a position and orientation that are especially well suited to the article in question.

However, it also frequently happens that the articles 13 and 14 are not the same, unlike the case shown in FIG. 1, and alternately one or more articles of one type and then one or more articles of a second type, etc., are moved through the chamber 1. As described above, the object sensor 20 at the chamber inlet 16 determines from the coded tag 21 which of several predetermined types of objects has just been introduced into the chamber 1. This information is entered in a shift register associated with the microprocessor in the control unit 2. The sensor 17 produces clock signals synchronously with the movement of the chain 15, for instance one clock signal for every two centimeters advance of the chain, and thereby acts as a clock signal generator. Each clock signal from sensor 17 shifts the article identification information one position in the shift register synchronously with the advance of the article up to one of the spray nozzles, for instance, nozzle 8. It will be appreciated that these clock signals, besides controlling the shift register, can also be used to control the procedure used to spray a given article. Since a clock signal is generated for each 2 cm, the conveyor chain 15 moves, the article can be divided into imaginary portions or zones separated by vertical lines. The clock signals are then used to cause the microprocessor in the control unit 2 to select different (preprogrammed) parameters (nozzle position, output, etc.) for each zone. It will be understood that a given parameter may be left unchanged for two or more successive zones, if desired.

The microprocessor program controls, for instance:

(a) at what beat (clock signal) or how many beats after the article is detected by sensor 17 a given coating or work step is to begin and how long that step or work process is to last;

(b) what types of articles 13, 14 are to be coated in what manner and with what coating material or materials;

(c) which of the nozzles 6-9 are to be used and at what time in a given spraying procedure;

(d) what voltage is to be used for electrostatically charging the powder, what amount of powder is to be ejected per unit of time from each nozzle, what amount of air is to be ejected with the powder and what spray angle is to be used for each nozzle;

(e) what color or type of powder is to be used at each nozzle;

(f) which positioning stand, 10 or 11, is to be used;

(g) along what axis or axes x, y, z any necessary nozzle position adjustments are to be made;

(h) what speeds are to be used for the conveyor chain and the movements of the nozzles;

(i) into what positions the corresponding parts are to be moved in x, y or z direction.

For this purpose, two digital-analog converters are preferably provided in the control unit 2.

The microprocessor program must frequently be adapted to new conditions. Such changes can be made by means of the keyboard 4 into the microprocessor. Corrections in the program are unfortunately frequently also necessary because changes in the quality of the powder and of the climate in the chamber affect the characteristics of the coating. Moreover, in accordance with the invention, the apparatus is designed so that the output of the nozzles 6-9 can be increased or decreased manually by a certain predetermined percentage.

When fewer nozzles are necessary for a selected spraying procedure than are provided in the apparatus, the extra nozzles can serve as spares and should one of the other nozzles fail, a spare can take over the function thereof.

Figure 2:
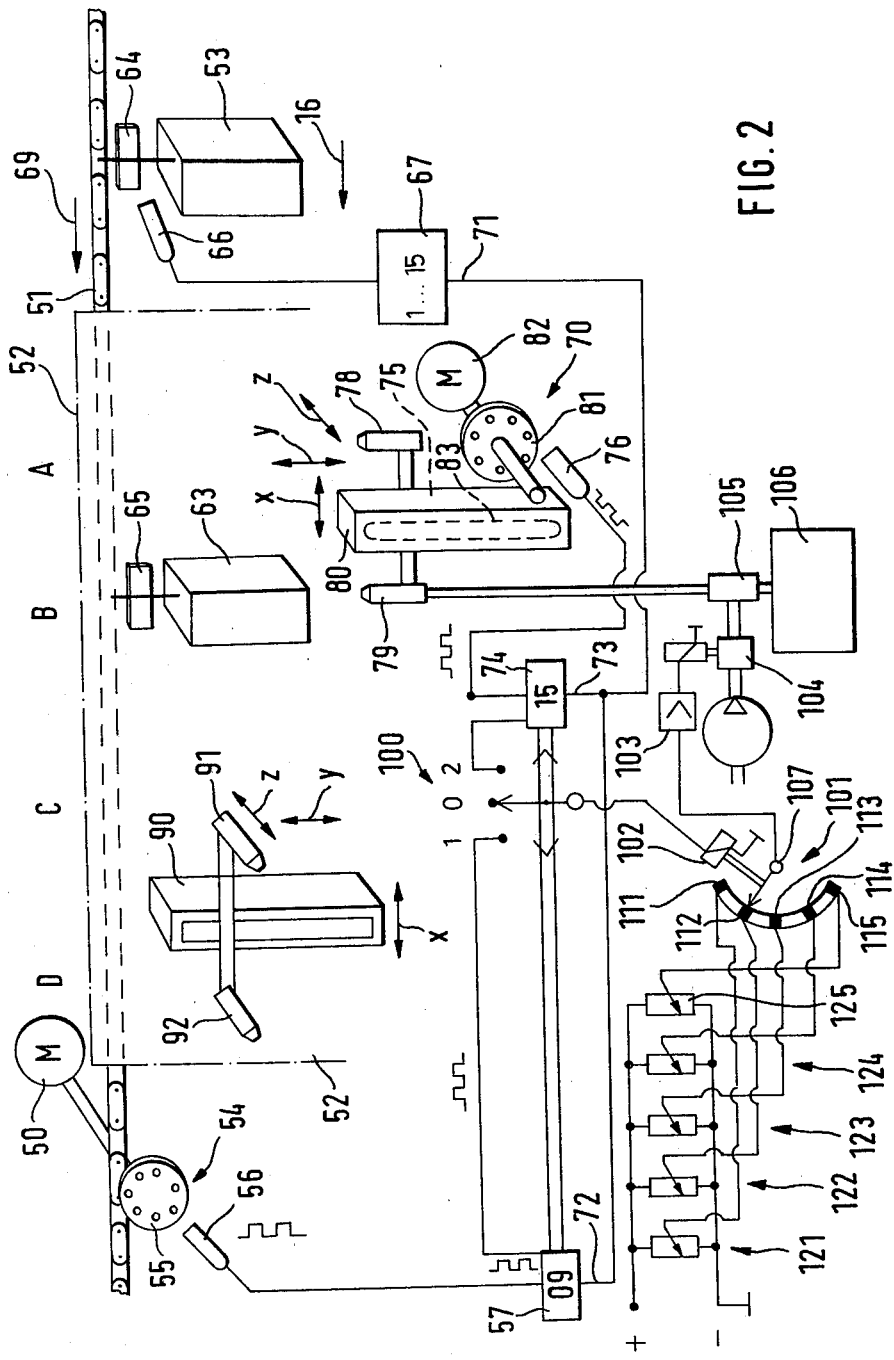
FIG. 2 is a schematic view of another preferred embodiment of the invention.
Figure 3:
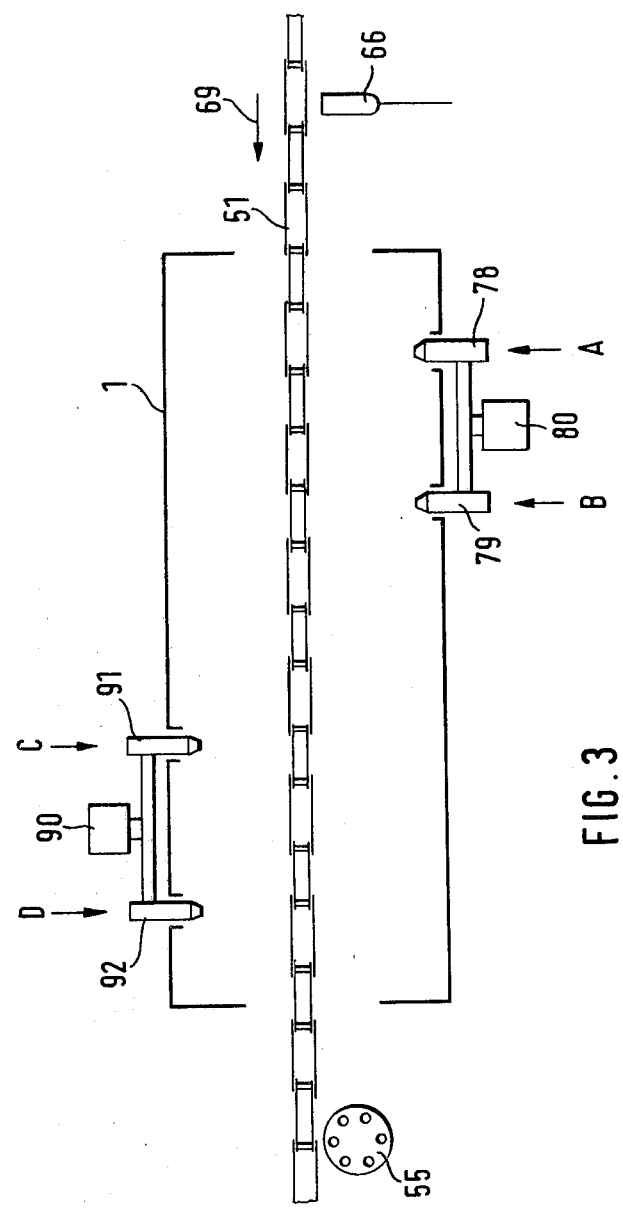
FIG. 3 is a schematic view from above into a coating chambers of the embodiment of FIG. 2.

A second preferred embodiment is shown in FIGS. 2 and 3, with reference to which only the parts which differ from the embodiment of FIG. 1, or which must be discussed again for clarity, will be described.

FIGS. 2 and 3 show a conveyor chain 51, driven by a motor 50, for transporting articles or objects 53, 63 to be coated in a coating chamber 52. The direction of movement of the conveyor chain 51 is indicated by arrow 69. Nozzle stands 80, 90 are provided adjacent the chamber 52. Each stand 80, 90 has two coating nozzles 78, 79 and 91, 92, respectively, that project into the interior of chamber 52 through apertures in the walls thereof at locations A, B, C and D, respectively. Positioning stand 80 has a lift mechanism 75, which may for instance comprise a lift chain 83 or similar components, for positioning spray nozzles 78 and 79. A similar lift mechanism may be provided for stand 90. The positioning stands 80, 90 are adapted to move their respective nozzles along any of axes x, y, z or along any combination thereof, either by moving the nozzles while the stands remain stationary, or by the stands moving relative to the coating chamber 52, or by some combination of these two types of movements.

A first clock signal generator 54 has a multiapertured disc 55 which is driven by the conveyor chain 51, in a manner that those skilled in the art will be able readily to effect without further description. The apertures of the disc are scanned by a sensor 56. The sensor 56 may, for instance, be a photocell. In the preferred embodiment shown by way of illustration, the disc 55 has n apertures (n being a natural number) evenly spaced around the circumference of the disc 55. The disc 55 is rotated by chain 51 through 360° (one full revolution) as the chain 51 moves a distance of nx cm., where x is a fixed number, for example two. In the case of this example, each revolution of the disc 55 from one aperture to the next, i.e. the interval between two consecutive clock signals, corresponds to an advance of 2 cm by the conveyor chain 51.

The clock signal generator 54 may alternatively be a mechanical or electric clock whose beat time equals the time required for the transport device to advance a predetermined distance (e.g. 2 cm). However, the clock generator is preferably a pulse generator which is driven synchronously with the transport device and which generates a pulse signal, preferably a square pulse, for each predetermined distance (e.g. 2 cm) moved by the transport device. The clock pulses are counted by a counter 57.

Each article 53 or 63 to be coated is provided with a code plate 64 or 65, respectively, which is scanned by a code sensor 66 at the chamber inlet 16. The code sensor 66 determines when an article 53 or 63 to be coated enters the chamber 52 and what type of article it is.

The output of the code sensor 66 is connected to a microprocessor based control circuit 67, which preferably includes a shift register that records when an article, and what type of article, has entered the chamber 52.

The output 71 of control circuit 67 is connected to the input 72 of a first counter 57 and to the input 73 of a second counter 74.

The second counter 74 counts the pulses produced by a clock pulse generator 70, which generates one pulse signal for each predetermined distance the lift mechanism 75 moves in positioning nozzles 78, 79 on stand 80. A similar arrangement of a clock pulse generator and a counter is provided for stand 90, but is not shown. The clock pulse generator 70 preferably comprises a photocell 76 which scans an aperture disk 81 which is seated on the drive shaft of the motor 82 of the lift mechanism 75.

The outputs of counters 57 and 74 are selectively connected, by means of a changeover switch 100, to a rotary selector 101. The rotary selector 101 is a step-by-step switch driven by an electromagnet 102. An amplifier 103 which converts voltage signals at its input into current signals at its output and a current-controlled pressure regulator 104 are preferably provided to control, by means of the rotary selector 101, the compressed air pressure in an injector 105 which feeds the powder coating material to one or more of the spray nozzles 78, 79, 91, 92 from a storage container 106. The input of amplifier 103 is connected to a center tap 107 of the rotary selector 101.

Variable resistors 121, 122, 123, 124 and 125 are connected to tappable connections 111, 112, 113, 114 and 115 of the rotary selector 101. Different voltages can thus be tapped corresponding to the compressed-air pressure desired at the injector 105. Preferably, potentiometers 121–125 can be reset by control circuit 67 if the program requires them to be reset. In addition, when control circuit 67 is reprogrammed, the settings to be given to each potentiometer can be changed as desired. As noted, such reprogramming can be carried out by means of keyboard 4 (see FIG. 1). The values at which the potentiometer are set can be displayed on a screen 3 associated with the keyboard 4.

Also, although only five potentiometers 121–125 are shown, in practice it is desirable to provide a very large number of them.

Because the rotary selector 101 can be controlled by either of counters 57 and 74, it can be used to control the amount of powder coating material which is fed to the guns as a function either of the movement of the conveyor chain 51 (when counter 57 controls) or of the movement of the spray nozzles 78 and 79 or their positioning stand 80 along one or more of the axes of movement x, y, z (when counter 74 controls).

The code sensor 66 inputs to the control circuit 67, in binary code, the information as to what type of object 53 or 63 is entering the chamber 52. A memory of the control circuit 67 stores this information, preferably in a shift register, until the object 53 or 63 has reached a predetermined spraying position A, B, C or D, where the first step of the coating process is carried out. As the article is then moved to other spraying stations, additional steps of the spraying process (assuming the process that has been programmed for the type of article in question has more than one step) are carried out. The control circuit 67 decides whether, for instance, the counter 57 or the counter 74 controls the operation of rotary selector 101. The selected counter 57 or 74 will then decide how long the injector 105 sprays powder at each of the pressures determined by potentiometers 121–125. For example, if selector 101 is at position 112, injector 105 will spray powder at a pressure determined by potentiometer 122 until selector 101 is moved to position 113. Counter 57 will generate an output signal which is applied to electromagnet 102 and causes selector 101 to move to position 113 after counter 57 has counted, for example, nine beats (clock signals from the pulse generator 54). In this manner, the conveyor chain 51 then moves nine beats, i.e. $9 \times 2$ cm = 18 cm, farther before switching is effected, from position 112 to position 113.

If, for example, position 113 is to be maintained for a period of time deterimined as a function of the lift movement of the positioning stand 80, then the output from the second counter 74 will control movement of rotary switch 101 in place of the output of counter 57. This switching (between counters 57, 74) is preferably effected automatically under the direct control of the microprocessor of control circuit 67. The length of each step can also be controlled by the microprocessor in accordance with the program stored therein.

The electronics of the entire apparatus can be constructed of discrete components. In practice, however, a so-called freely programmable control controlled by a microprocessor is preferable. This provides numerous advantages in connection with the creation of the program, which will be apparent to those skilled in the art.

As an illustration of the information that may be included in the program, the following Example is given. The following table gives settings, etc., for the apparatus for carrying out an illustrative spraying step. In this Example, it is assumed that the apparatus has ten spray nozzles. The step shown is the second step in the program for coating an object of type 04, and requires spraying the object with only nozzle number 01 at work position A, with the indicated initial nozzle position and orientation, speeds and directions of nozzle movement, type of coating material, and electrostatic charging voltage. The spraying is to continue nine beats.

| Position: A | | Object No.: 04 | | Step No.: 02 | | | |
|---|---|---|---|---|---|---|---|
| TA | FA | x – CO | y – CO | z – CO | P 1 | P 2... | P 10 |
| 09 | 00 | < 05 | U 78 | F OO | KV 90 | 00 | 00 |
| +0 | | > 0 | D 22 | B 66 | PU 77 | 00 | 00 |
| −0 | | | R 40 | > 0 | DO 43 | 00 | 00 |
| | | | L 40 | < 0 | ZE 65 | 00 | 00 |
| | | | P OO | P O | ST 80 | 00 | 00 |

TA = number of beats in the step (i.e. duration of the step);
FA = color or nature of the coating powder;
x – CO = x-coordinate of the stand carrying nozzles nos. 1-10;
 < number of beats during which the stand is to move in the x-direction, in the same direction as the chain moves;
 > number of beats during which the stand is to move in the x-direction, in the opposite direction to that of the chain;
y – CO = y-coordinate of the stand carrying nozzles nos. 1-10;
 U = limitation of lift in upward direction;
 D = limitation of lift in downward direction;
 R = speed of raising;
 L = speed of lowering.
 P = positioning of the Y-carriage at its lower limit (D);
z – CO = z-coordinate;
 F = position front;
 B = position rear;
 > = speed forward;
 < = speed reverse.
P 1 = nozzle 1;
P 2 = nozzle 2;
P 10 = nozzle 10.
KV = electrostatic charging voltage in kV (range=0-100 kV);
PU = powder delivery pressure at the injector;
DO = powder dosaging pressure at the injector;
ZE = spray pressure;
ST = jet angle of the spray nozzle with respect to the object.

The present invention may be embodied in other specific forms without departing from the spirit or essential attributes thereof, and, accordingly, reference should be made to the appended claims, rather than to the foregoing specification, as indicating the scope of the invention.

What is claimed is:

1. An apparatus for the automatic spray-coating of an object while the object is in a predetermined spray-coating region, comprising:
 conveyor means for conveying said object along a predetermined path and through a predetermined spray-coating region;
 first sensor means for generating a first signal when said object is located at a predetermined point along said path and upstream of said region;
 second sensor means for generating a series of second signals at a frequency related to the speed at which said conveyor means moves said object along said path;
 a programmed control means for generating a sequence of control signals responsive to said first signal and determinative of a spraying operation sequence;
 first counter means receiving both said second signals and said control signals, said first counter means generating an output signal when it receives a number of second signals determined by said control signals; and
 spray-coating means for spray-coating said object as it moves through said region, said spray-coating means varying its operation as a function of said output signal.

2. The apparatus of claim 1, wherein said spray-coating means includes a plurality of spray nozzles.

3. The apparatus of claim 2, wherein said spray-coating means further includes means for changing the position, along at least one axis defined relative to said spray region, of at least one said nozzle relative to said spray region.

4. The apparatus of claim 3, wherein said control means includes means for controlling the position of said at least one nozzle.

5. The apparatus of claim 3, wherein said spray-coating means further includes means for controlling the orientation of said at least one nozzle relative to said axes.

6. The apparatus of claim 1, wherein said spray-coating means further comprises electrostatic charging means located for generating an electric field in a portion of the path of a powder coating material applied by said spray-coating means for electrostatically charging a powder coating material.

7. The apparatus of claim 6, wherein said spray-coating means includes means for controlling the electrostatic charging voltage used to charge said powder coating material.

8. The apparatus of claim 1, wherein said second sensor means generates one said second signal each time said conveyor means has moved said object a predetermined distance toward said spray region.

9. The apparatus of claim 8, wherein said predetermined distance is approximately 2 centimeters.

10. The apparatus of claim 8, wherein said control means includes shift register means for clocking said first signal therethrough at a rate determined by said second signals; said control means causing said spray-coating means to initiate a predetermined spray-coating process when said first signal has been shifted through said shift register means.

11. The apparatus of claim 1, wherein said first sensor means is adapted to generate said first signal in such a manner as to make said first signal indicative of which of several predetermined types of objects is at said predetermined point.

12. The apparatus of claim 11, wherein said control means causes said spray-coating means to spray coat said object in a selected one of several predetermined manners as a function said first signal.

13. The apparatus of claim 1, wherein said control means is reprogrammable.

14. The apparatus of claim 13, wherein said control means includes keyboard means for reprogramming it.

15. The apparatus of claim 13, wherein said control means includes a microprocessor.

16. The apparatus of either of claims 13 or 15, wherein said control means further includes display means for displaying information representative of the contents of a program stored in said control means.

17. The apparatus of claim 1, wherein said first and second sensor means are located sufficiently remote from said spray-coating region to avoid being contaminated by coating material sprayed by said spray-coating means.

18. The apparatus of claim 1, wherein said second sensor means includes means mechanically coupled to said conveyor means for monitoring the movement of said conveyor means.

19. The apparatus of either of claims 1 or 18, wherein said second sensor means includes light-sensitive means for monitoring the movement of said conveyor means.

20. The apparatus of claim 1, wherein said operation which is varied as a function of said output signal is the amount of coating which is sprayed by said spray-coating means.

21. The apparatus of claim 20, wherein said spray-coating means comprises:
   means for adjusting the amount of coating which is sprayed on said object as a function of a spray-coating signal applied thereto;
   means for generating said spray-coating signal and adjusting the valve thereof in response to said output signal.

22. The apparatus of claim 1, wherein said spray-coating means includes at least one spray nozzle and means for moving said nozzle along at least one axis relative to said spray region and wherein said apparatus further comprises:
   third sensor means for monitoring the movement of said at least one nozzle along said one axis and for generating a series of third signals at a frequency determined by the rate at which said at least one nozzle is moved along said one axis; and
   second counter means receiving both said third signals and said control signals, said second counter means generating an output signal when it receives a number of third signals determined by said control signals;
   said spray-coating means varying its operation as a function of said first counter means output signal when said apparatus is operated in a first mode and as a function of said second counter means output signal when said apparatus is operated in a second mode.

23. The apparatus of claim 22, wherein said control means determines the mode of opration of said apparatus.

24. The apparatus of claim 23, wherein said spray-coating means includes:
   switch means having first and second inputs and an output, said first input receiving said first counter means output signal, said second output receiving said second counter means output signal, said switch means being operable in a first state wherein it applies said first counter means applies said second counter means output signal to its output; said control means generating a signal which determines the operating state of said switch; and
   means for varying the manner in which said object is spray coated as a function of the signals appearing at said output of said switch means.

25. The apparatus of claim 24, wherein said means for varying comprises:
   means for adjusting he amount of coating which is sprayed on said object as a function of a spray-coating signal applied thereto; and
   means for generating said spray-coating signal and adjusting the valve thereof as a function of the signals appearing at said output of said switch means.

* * * * *